United States Patent
Durston et al.

(10) Patent No.: US 9,494,426 B2
(45) Date of Patent: Nov. 15, 2016

(54) FAULT DETECTION USING SKEWED TRANSDUCERS

(71) Applicants: Atlantic Inertial Systems Limited, Plymouth (GB); Sumitomo Precision Products Company Limited, Amagasaki (JP)

(72) Inventors: Michael Durston, Plymouth (GB); Takafumi Moriguchi, Amagasaki (JP); Ryuta Araki, Amagasaki (JP)

(73) Assignee: Atlantic Inertial Systems Limited, Plymouth (GB)

( * ) Notice: Subject to any disclaimer, the term of this patent is extended or adjusted under 35 U.S.C. 154(b) by 282 days.

(21) Appl. No.: 14/361,437

(22) PCT Filed: Nov. 27, 2012

(86) PCT No.: PCT/GB2012/052923
§ 371 (c)(1),
(2) Date: May 29, 2014

(87) PCT Pub. No.: WO2013/079925
PCT Pub. Date: Jun. 6, 2013

(65) Prior Publication Data
US 2014/0338449 A1    Nov. 20, 2014

(30) Foreign Application Priority Data
Nov. 29, 2011 (GB) .................................. 1120536.6

(51) Int. Cl.
*G01C 19/56* (2012.01)
*G01C 19/5684* (2012.01)

(52) U.S. Cl.
CPC ................................ *G01C 19/5684* (2013.01)

(58) Field of Classification Search
CPC .................................................. G01C 19/5684
USPC ............................................ 73/1.37, 504.13
See application file for complete search history.

(56) References Cited

U.S. PATENT DOCUMENTS 7,617,727 B2 * 11/2009 Watson .............. G01C 19/5691
                                                73/504.13
9,176,158 B2 * 11/2015 Townsend .......... G01C 19/5684
(Continued)

FOREIGN PATENT DOCUMENTS

| GB | 2327265 | 1/1999 |
| WO | 2007120158 | 10/2007 |
| WO | WO 2011/107542 | * 9/2011 |

OTHER PUBLICATIONS

International Search Report and Written Opinion dated Mar. 21, 2013 in PCT/GB2012/052923.
(Continued)

*Primary Examiner* — John Chapman, Jr.
(74) *Attorney, Agent, or Firm* — Snell & Wilmer, L.L.P.

(57) ABSTRACT

A vibratory gyroscope is provided comprising a plurality of secondary pickoff transducers which are each sensitive to the secondary response mode, wherein: at least two of the secondary pickoff transducers comprise skew transducers designed to be sensitive to the primary mode which produce an induced quadrature signal in response thereto. A method of using the gyroscope is provided comprising the steps of arranging electrical connections between the secondary pickoff transducers and a pickoff amplifier so that in use the induced quadrature signal is substantially rejected by the amplifier in the absence of a fault condition, and the amplifier outputs an induced quadrature signal when a fault condition disconnects one of the skew transducers from the amplifier, and a comparator compares the quadrature output from the pickoff amplifier with a predetermined threshold value and provides a fault indication when the predetermined threshold is exceeded.

16 Claims, 3 Drawing Sheets

(56) References Cited

U.S. PATENT DOCUMENTS

2007/0240508 A1 10/2007 Watson
2007/0256495 A1 11/2007 Watson

OTHER PUBLICATIONS

Search Report dated Mar. 20, 2012 in GB Application No. GB1120536.6.

* cited by examiner

FAULT DETECTION USING SKEWED TRANSDUCERS

CROSS-REFERENCE TO RELATED APPLICATIONS

This application is U.S. national phase filing under 35 U.S.C. §371 of PCT/GB2012/052923 filed on Nov. 27, 2012, and claims priority from United Kingdom Application No. GB 1120536.6 which was filed on Nov. 29, 2011, both of which are incorporated herein by reference.

The present invention relates to gyroscopes, and particularly to vibratory gyroscopes based on micro electro-mechanical systems (MEMS) technologies.

Gyroscopes are used to measure angular orientation or angular rate, and are required in a wide range of applications, including game controllers, navigation, optical stabilisation systems, and vehicle braking systems. MEMS technologies have been applied to miniaturise gyroscopes, and MEMS gyroscopes are typically vibratory structures in which a primary vibrational mode of a structure is excited by a time varying force, and rotation of the structure results in a coupling of the primary vibrational mode into a secondary vibrational mode. The secondary vibrations are detected, and are related to the rate of rotation.

A number sub-categories of such vibratory structures exist, the two most widely used being ring gyroscopes and shuttle mass gyroscopes. In ring gyroscopes the primary and secondary mode comprise flexural vibrations of a ring shaped structure. In shuttle mass gyroscopes the primary and secondary modes typically comprise mutually orthogonal shuttle modes in which a mass suspended on spring flexures shuttles backwards and forwards.

It is desirable for gyroscopes to operate reliably, and furthermore to be able to detect and report a fault condition. It is further desirable for gyroscopes to be able to respond to fault conditions by compensating for errors arising therefrom. Gyroscopes are often required to operate or survive in harsh environments including high shock environments. One potential source of error in such devices is a break in one or more of the electrical connections between elements of the device. Such a break can be difficult to detect and may not totally prevent operation of the device, and instead may alter the sensitivity or scale factor of the device.

US2010/0281976 discloses a silicon vibrating ring gyroscope comprising a thin film piezoelectric material, employing in plane flexural vibrations, with piezoelectric transduction to drive and sense the vibrations.

WO2007/120158 and US2007/0240508 describe an inertial rate sensor having sense or drive elements which are arranged to operate on axes that are rotationally skewed from their typical positions in which they are aligned with a node or antinode axis.

It is an object of the invention to provide a device in which enhanced fault detection can be achieved.

According to a first aspect of the present invention, there is provided a vibratory gyroscope comprising a plurality of secondary pickoff transducers which are each sensitive to the secondary response mode, wherein: at least two of the secondary pickoff transducers comprise skew transducers designed to be sensitive to the primary mode which produce an induced quadrature signal in response thereto.

The vibratory gyroscope may further comprise a pickoff amplifier and electrical connections between the secondary pickoff transducers and the pickoff amplifier wherein the secondary pickoff transducers, electrical connections and pickoff amplifier are arranged so that in use the induced quadrature signal is substantially rejected by the amplifier in the absence of a fault condition, and the amplifier outputs an induced quadrature signal when a fault condition disconnects one of the skew transducers from the amplifier, and a comparator compares the quadrature output from the pickoff amplifier with a predetermined threshold value and provides a fault indication when the predetermined threshold is exceeded.

A first skew transducer and a second skew transducer may have induced quadrature signals with substantially the same phase and magnitude that are combined at inverting and non-inverting inputs to the pickoff amplifier.

The secondary pickoff transducers may comprise positive and negative pickoff transducers which produce outputs in response to the secondary mode which have substantially 180 degrees phase difference, and the first skew transducer may be a positive secondary pickoff transducer and the second skew transducer may be a negative secondary pickoff transducer.

A skew transducer may be electrically connected to another secondary pickoff transducer and/or the pickoff amplifier by a wire bond.

A failure of any single electrical connection may result in a fault indication.

A skew transducer may be electrically connected to the pickoff amplifier by a series arrangement of wire bonds, so that failure of any single connection of the series arrangement will result in a fault indication.

Each wire bond connecting the secondary pickoff transducers to the pickoff amplifier may be made in parallel, and skew transducers associated with each wire bond so that the failure of any wire bond results in a fault indication.

The comparator may comprise a demodulator/filter that filters and demodulates the output of the pickoff amplifier to remove the rate output, leaving the quadrature component.

The comparator may further comprise an analogue to digital convertor that converts the analogue output of the demodulator/filter to a digital output.

The comparator may further comprise a digital processor that stores predetermined values and/or ranges of quadrature output that correspond to various fault conditions, and may compare the digital output of the analogue to digital convertor with the predetermined values and/or ranges to identify fault conditions.

The secondary pickoff transducers may be capacitive, piezoelectric or inductive.

The vibratory gyroscope may be a ring gyroscope.

According to a second aspect of the invention, there is provided a method of using the gyroscope of the type set out above, comprising the steps of arranging electrical connections between the secondary pickoff transducers and a pickoff amplifier so that in use the induced quadrature signal is substantially rejected by the amplifier in the absence of a fault condition, and the amplifier outputs an induced quadrature signal when a fault condition disconnects one of the skew transducers from the amplifier, and a comparator compares the quadrature output from the pickoff amplifier with a predetermined threshold value and provides a fault indication when the predetermined threshold is exceeded.

The electrical connections may comprise a first electrical connection connecting a first skew transducer to an inverting input of the pickoff amplifier, and a second electrical connection connecting a second skew transducer to a non-inverting input of the pickoff amplifier.

The first and second skew transducers may produce an induced quadrature signal of substantially the same phase and magnitude.

Each electrical connection between the secondary pickoff transducers to the pickoff amplifier may be made in parallel, and skew transducers are associated with each connection so that the failure of any connection results in a fault indication.

The phase and magnitude of the quadrature output from the pickoff amplifier may be compared with a pre-determined range of values to identify the fault.

The invention will further be described, by way of example, with reference to the following drawings in which.

The Coriolis force $F_C$, is an apparent force on a body with velocity V, in a rotating frame due to the rotation of the frame with respect to an inertial frame of reference, according to the following relationship:

$$F_C = -2 \cdot m \cdot \Omega \times V \quad (1)$$

Wherein $\Omega$ is the angular rate of rotation of the rotating frame, and m is the mass of the body. A vibrating gyroscope works by maintaining vibratory oscillations of a body in a first drive mode, and arranging for the Coriolis force to couple vibrations into a second sense mode. The Coriolis force results in a Coriolis acceleration that is in phase with the velocity of the body. The skilled person will understand that due to the 90 degree phase difference between position, velocity and acceleration respectively, the sense displacement resulting from Coriolis acceleration is phase shifted by 90 degrees relative to the drive displacement. It can thereby be readily distinguished from errors which arise due to imperfections in the structure, sensing and drive system that may result in primary vibration being detected as secondary vibration in the absence of rotation. Drive vibrations coupled into the secondary mode in this way are in phase with the primary vibration, in contrast to the vibrations resulting from Coriolis acceleration, which are shifted in phase by 90 degrees. Such unwanted vibrations detected in the secondary mode are typically referred to as quadrature signals since they are in quadrature (90 degrees phase shifted) from the desired sense signal. In an open loop configuration, additional phase shifts may be present.

Figure 1:
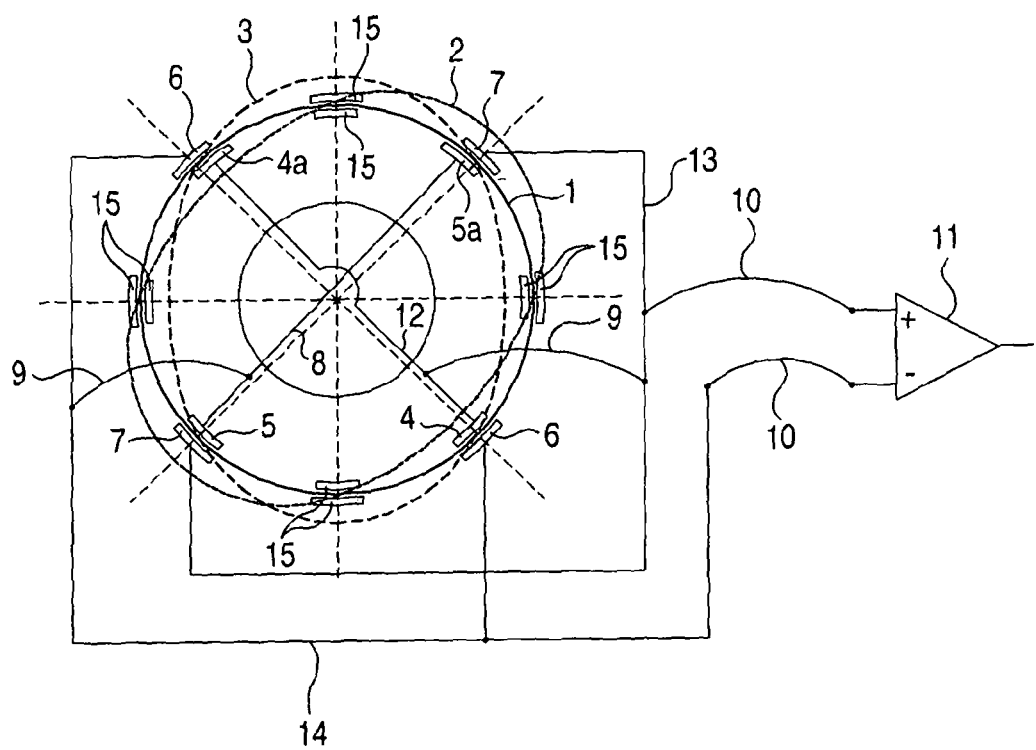
FIG. 1 is a schematic of a ring gyroscope according to an embodiment of the invention.

The schematic of FIG. 1 shows a ring gyroscope which vibrates in the cos 2θ mode in which the radial displacement v, of a point of the ring varies according to the relationship:

$$v = \sin(\omega \cdot t + \psi) \cdot \cos(2\theta + \phi) \quad (2)$$

Wherein t is time, ω is the angular frequency of vibration, θ is the angular position around the ring with respect to the body coordinates of the ring, φ is the angular offset of the mode relative to the body coordinates of the ring, and ψ is the phase shift of the vibration relative to the forcing vibration. Provided the ring structure is isotropic, circular, and of uniform section, the flexural modes are degenerate in angular orientation, which is to say that the natural frequency of the modes does not vary with their orientation φ.

The ring gyroscope depicted schematically in FIG. 1 has secondary (or sense) mode 2 (ψ=45°) and primary (or driven) mode 3 (ψ=0°) at 45 degrees to one another. Both modes are cos 2θ modes, and the magnitude of the modes is exaggerated for clarity. Secondary pickoff (SPO) transducers 4, 5, 6, 7 are arranged to sense displacements in the secondary mode 2 and are positioned at NE, NW, SW, SE positions around the ring 1. Primary transducers 15 maintain the vibration of the primary mode 3, positioned at N, S, E, W around the ring.

Suitable transducers for driving and detecting the vibration of the ring structure include capacitive, piezoelectric, inductive and electrostrictive or combinations thereof. Parallel plate capacitive transducers are typically used in the context of a ring gyroscope, and inter-digitated capacitive transducers are typical for shuttle mass gyroscopes. A combination of different transducers may be employed.

The SPO transducers 4, 5, 6, 7 are parallel plate capacitive transducers, and are generally positioned at anti-nodes of the secondary vibration 2, and at nodes of the primary vibration 3, and are thereby generally designed to be insensitive to the primary mode 3, and maximally sensitive to the secondary mode 2. The SPO transducers comprise hub sensors 4, 5 that are located radially inwards of the vibrating ring structure 1, and rim sensors 6, 7 that are located radially outwards of the vibrating ring structure 1. The secondary transducers 4, 5, 6, 7 are split into positive secondary pickoff (SPO+) transducers 4, 7 and negative secondary pickoff (SPO−) transducers 5, 6. The output of the SPO+ transducers 4, 7 is phase shifted by 180 degrees relative to that of the SPO− transducers 5, 6, and is therefore of equal magnitude and opposite sign.

Hub SPO+ transducer 4a and hub SPO− transducer 5a are deliberately skewed or offset so that they have some sensitivity to the primary mode in addition to being sensitive to the secondary mode. SPO+ skew hub transducer 4a is rotationally shifted clockwise from NW towards N so that it is sensitive to the primary mode. SPO− skew hub transducer 5a is shifted counter-clockwise from NE towards N so that it is sensitive to the primary mode. The skewed transducers 4a, 5a are thereby shifted so that their response to the primary mode is in phase with each other. This results in a large common mode quadrature signal on SPO+ and SPO− that is at 90 degrees phase with the Coriolis induced secondary vibrations. Under normal system tolerances a normal quadrature signal will be present that varies from device to device and which results from asymmetry or anisotropy in the structure and pickoff. The skewed transducers are arranged to produce a skew quadrature signal that is larger than the largest normal quadrature signal that would arise under normal system tolerances. Normal system tolerances, and the largest normal quadrature signal thereby produced may form part of a device specification or may be estimated by statistical analysis of gyroscope performance, and of the manufacturing processes by which they are produced.

Electrically conducting tracking 8, 12 is used to connect the hub SPO+ transducers 5, 5a to each other and the hub SPO− transducers 4, 4a to each other. Similarly, conductive tracking 13, 14 is used to connect the rim SPO+ transducers 7 to each other and the rim SPO− transducers 6 to each other. Wire bonds 9 are used to connect the hub SPO+ and rim SPO+ transducers and the hub SPO− and rim SPO− transducers. Finally, wire bonds 10 are used to make connections off the MEMS chip to a differential pickoff amplifier 11. The SPO− signals are connected to the inverting input and the SPO+ signals are connected to the non-inverting input to combine their output, and to reject common mode signals (that are common to both SPO+ and SPO−). Provided both skew sensors 4a and 5a are connected in this way to the differential amplifier 11, the common mode quadrature signal produced as a result of the skew sensors 4a, 5a will be rejected by the differential amplifier 11.

If electrical connection to one of the skew sensors 4a, 5a is lost, the quadrature signal produced by skew will no longer be common mode, and will therefore not be rejected by the differential amplifier 11, resulting in a large quadrature output from the amplifier 11. Loss of any single bond wire 9 from the hub to the rim, or bond wire 10 from the MEMS device to the electronics will result in a loss of skew quadrature signal at one of the inputs to the amplifier 11, and will thereby result in a large quadrature output from the amplifier 11.

Figure 2:
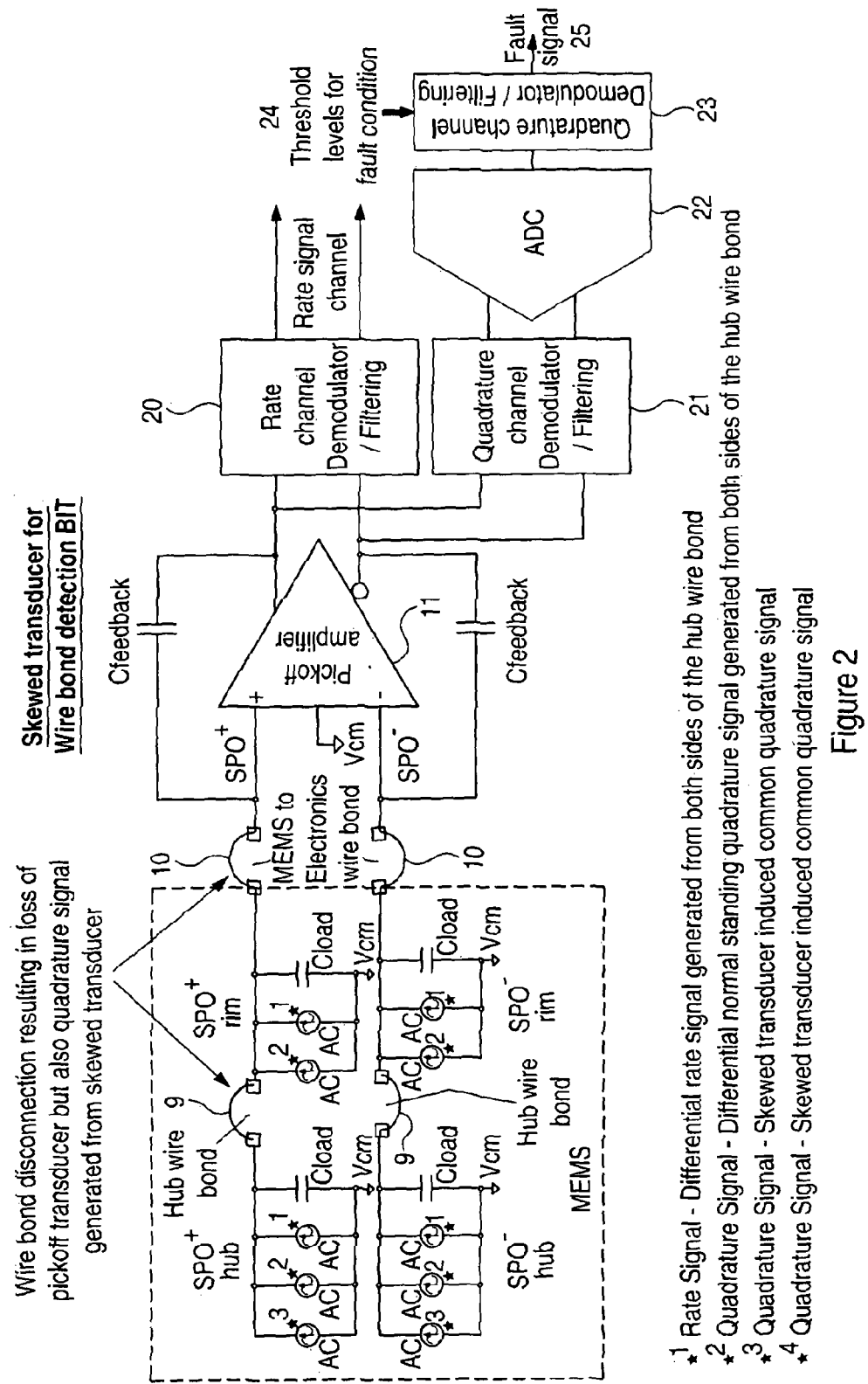
FIG. 2 is a schematic circuit diagram of a gyroscope and a pickoff arrangement according to an embodiment of the invention.

The circuit schematic of the gyroscope is schematically represented in FIG. 2, in which the contributions to the SPO+ and SPO− signals input to the amplifier 11 are shown. The rate signal resulting from Coriolis acceleration *1 and the normal quadrature signal *2 are present on SPO+ hub, SPO+ rim, SPO− hub and SPO− rim transducers. These are not common mode, and are at 180 degree phase in SPO+ relative to SPO−, and are thereby not rejected by the differential amplifier 11. The SPO+ skew signal *3 is introduced at the SPO+ hub transducers and the SPO− skew signal *4 is introduced at the SPO− hub transducers. The skew signals *3, and *4 thereby must pass through both hub wire bonds 9 and both MEMS to electronics wire bonds 10 to reach the amplifier 11. The common phase of both skew signals results in their rejection at the amplifier 11 when all bonds are intact.

The output of the amplifier 11 is fed to a rate channel demodulating filter 20 and a quadrature channel demodulating filter 21. The rate channel demodulating filter 20 demodulates and filters the output of the amplifier 11 to remove any quadrature signal, and provides an output which is related to the rate of rotation. The quadrature channel demodulating filter demodulates and filters the output of the amplifier 11 to remove the rate signal, and outputs only the quadrature signal. The quadrature signal is then converted from an analogue to a digital signal by the analogue to digital converter (ADC) 22. The digital output of the ADC 22 is then compared with a pre-determined threshold level 24 corresponding to a fault condition by a comparator 23 which outputs a fault signal 25 if the quadrature signal exceeds the threshold fault level. The threshold fault level is pre-determined, and corresponds with a quadrature output larger than that which would be expected or allowable under normal system tolerances.

Figure 3:
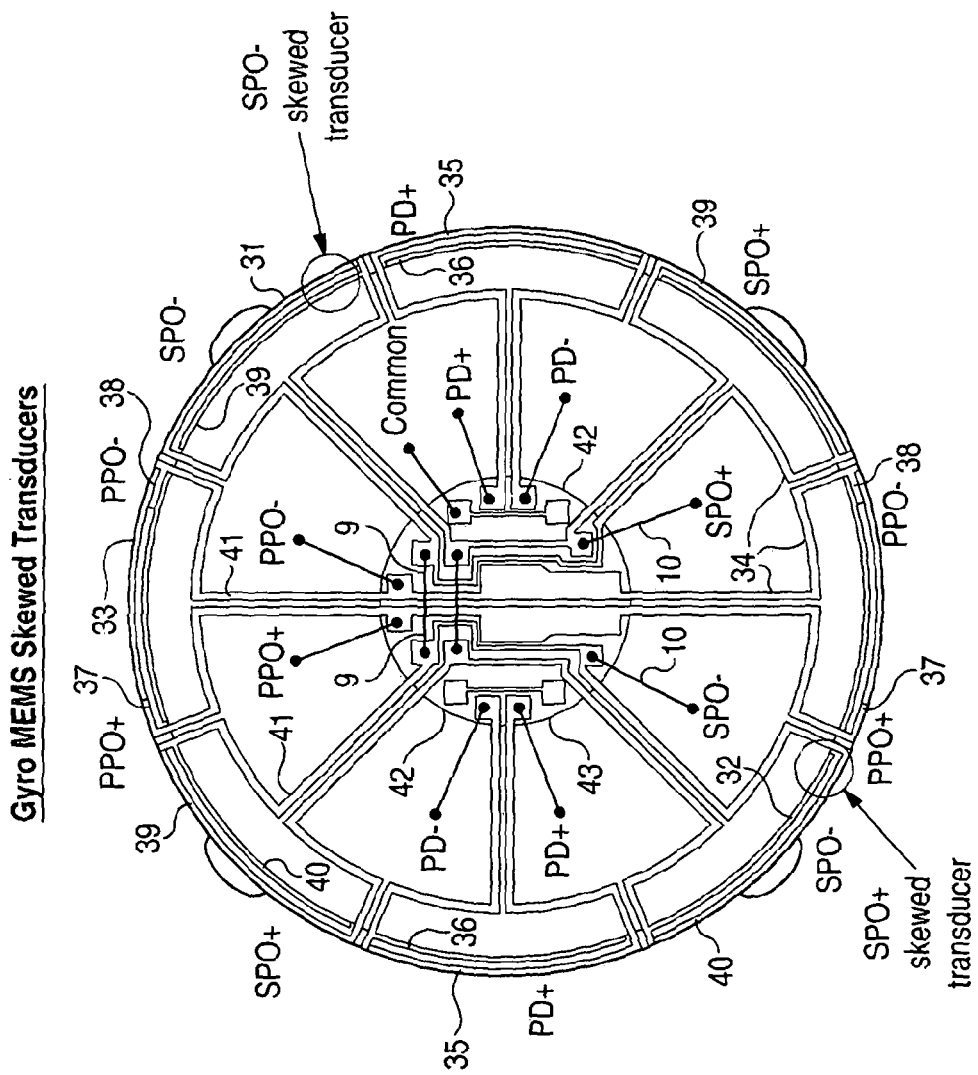
FIG. 3 is schematic of an alternative ring gyroscope according to an embodiment of the invention.

An alternative embodiment of the invention is shown in FIG. 3, which schematically depicts a ring vibratory gyroscope structure comprising a thin layer of piezoelectric material in which conducting electrodes on the surface are used as piezoelectric SPO transducers. For clarity, not all elements of the schematic are labelled with numerals. In FIG. 3, the secondary mode is considered to be aligned with $\psi=-45°$ according to equation 2. A ring structure 33 with eighth order rotational symmetry is shown, supported on ligaments or ring suspensions 34 each of which comprise a radial elements attached to the ring, a radial element attached to a fixed hub 43 and a circumferential elements joining the first and second radial elements. Eight ligament groups of two radially symmetric ligaments 34 are spaced at equal angles around the ring 33, and are attached at one end to the ring 33 and at the other to a fixed hub 43.

Conductive tracking and electrodes are provided on the surface of the ring, comprising positive and negative primary drive electrodes 35, 36 (PD+, PD−), positive and negative primary pickoff electrodes 37, 38 (PPO+, PPO−) positive and negative pickoff electrodes 39, 40 (SPO+, SPO−) respectively. Two skew electrodes are provided: an SPO− skew transducer 31, and an SPO+ skew transducer 32. Skew is introduced by decreasing the extent of the electrode of the skew transducer 31, 32 to deliberately increase sensitivity to the primary mode. Both skew transducers 31, have been sensitised by truncating their length, with the result that their centres are not aligned with the nodes of the primary mode. Both are designed to be sensitive in phase with the PPO+ transducers, thereby introducing common mode quadrature signals into SPO+ and SPO−. Bond wires 9 connect between pads on the hub 43 and bond wires 10 provide electrical connections off the MEMS die for SPO+ and SPO− from pads on the hub. Further bond wires are provided to make electrical connections to ground the ring, and for PD+, PD−, PPO+ and PPO−. The thin piezoelectric material on the surface of the ring provides the transduction mechanism by which electrical voltage and current are converted into mechanical force and displacement, and by which displacement and force are converted into voltage and current.

Although the forgoing has described a system in which a skew signal is deliberately introduced by designing the SPO transducers to be sensitive to the primary mode, the readout arrangement disclosed herein is also suitable for indentifying devices with an unacceptably high normal quadrature signal. Such devices are likely to be faulty, and may for instance have a broken ring suspension resulting in a high degree of structural asymmetry. In an alternative embodiment of the invention, the fault detection arrangement is employed on devices without skew transducers to identify high levels of normal quadrature.

According to an alternative embodiment of the invention, the gyroscope may be a shuttle mass vibratory gyroscope in which sense transducers are made sensitive to the primary mode, and are arranged to provide an induced quadrature signal that is normally rejected in the absence of a fault condition by the subsequent arrangement of electronics.

The forgoing has described an embodiment in which the SPO sensitivity to the primary drive signal and subsequent induced quadrature signal is produced by offsetting or skewing one of the SPO transducers. In an alternative embodiment of the invention, an additional skew transducer may be connected to the SPO to induce an appropriate quadrature signal. Alternatively a SPO transducer may be extended rather than offset or skewed.

An embodiment has been described in which bonds are made from the MEMS device to the pickoff amplifier from the rim electrodes. In an alternative arrangement bond wires may connect from the hub electrodes to the pickoff amplifier.

An arrangement of ring gyroscope with both hub and rim electrodes has been described. An alternative embodiment with either ring or hub electrodes only is envisaged as within the scope of the invention.

The invention claimed is:

1. A ring vibratory gyroscope comprising:
a plurality of secondary pickoff transducers which are each sensitive to the secondary response mode, at least two of the secondary pickoff transducers comprising skew transducers designed to be sensitive to the primary mode which produce an induced quadrature signal in response thereto; and
a pickoff amplifier and electrical connections between the secondary pickoff transducers and the pickoff amplifier wherein:
the secondary pickoff transducers, electrical connections and pickoff amplifier are arranged so that in use:
the induced quadrature signal is substantially rejected by the amplifier in the absence of a fault condition, and
the amplifier outputs an induced quadrature signal when a fault condition disconnects one of the skew transducers from the amplifier wherein a comparator compares the quadrature output from the pickoff amplifier with a predetermined threshold value and provides a fault indication when the predetermined threshold is exceeded.

2. The gyroscope of claim 1, wherein a first skew transducer and a second skew transducer have induced quadrature signals with substantially the same phase and magnitude that are combined at inverting and non-inverting inputs to the pickoff amplifier.

3. The gyroscope of claim 2, wherein the secondary pickoff transducers comprise positive and negative pickoff transducers which produce outputs in response to the secondary mode which have substantially 180 degrees phase difference, and the first skew transducer is a positive secondary pickoff transducer and the second skew transducer is a negative secondary pickoff transducer.

4. The gyroscope of claim 1, wherein a skew transducer is electrically connected to another secondary pickoff transducer and/or the pickoff amplifier by a wire bond.

5. The gyroscope of claim 4, wherein a skew transducer is electrically connected to the pickoff amplifier by a series arrangement of wire bonds, so that failure of any single connection of the series arrangement will result in a fault indication.

6. The gyroscope of claim 4, wherein each wire bond connecting the secondary pickoff transducers to the pickoff amplifier is made in parallel, and skew transducers are associated with each wire bond so that the failure of any wire bond results in a fault indication.

7. The gyroscope of claim 1, wherein a failure of any single electrical connection results in a fault indication.

8. The gyroscope of claim 1, wherein the comparator comprises a demodulator/filter that filters and demodulates the output of the pickoff amplifier to remove the rate output, leaving the quadrature component.

9. The gyroscope of claim 8, wherein the comparator further comprises an analogue to digital convertor that converts the analogue output of the demodulator/filter to a digital output.

10. The gyroscope of claim 9, wherein the comparator further comprises a digital processor that stores predetermined values and/or ranges of quadrature output that correspond to various fault conditions, and compares the digital output of the analogue to digital convertor with the predetermined values and/or ranges to identify fault conditions.

11. The gyroscope of claim 1, wherein the secondary pickoff transducers are capacitive, piezoelectric or inductive.

12. A method of using the gyroscope of claim 1, comprising the steps of:
arranging electrical connections between the secondary pickoff transducers and a pickoff amplifier so that in use:
the induced quadrature signal is substantially rejected by the amplifier in the absence of a fault condition, and
the amplifier outputs an induced quadrature signal when a fault condition disconnects one of the skew transducers from the amplifier, and
a comparator compares the quadrature output from the pickoff amplifier with a predetermined threshold value and provides a fault indication when the predetermined threshold is exceeded.

13. The method of claim 12, wherein the electrical connections comprise a first electrical connection connecting a first skew transducer to an inverting input of the pickoff amplifier, and a second electrical connection connecting a second skew transducer to a non-inverting input of the pickoff amplifier.

14. The method of claim 13, wherein the first and second skew transducers produce an induced quadrature signal of substantially the same phase and magnitude.

15. The method of claim 12, wherein each electrical connection between the secondary pickoff transducers to the pickoff amplifier is made in parallel, and skew transducers are associated with each connection so that the failure of any connection results in a fault indication.

16. The method of claim 12, wherein the phase and magnitude of the quadrature output from the pickoff amplifier is compared with a pre-determined range of values to identify the fault.

* * * * *